United States Patent
Niigata

(10) Patent No.: US 9,054,948 B2
(45) Date of Patent: Jun. 9, 2015

(54) STORAGE APPARATUS, SWITCH AND STORAGE APPARATUS CONTROL METHOD

(75) Inventor: Katsuya Niigata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 450 days.

(21) Appl. No.: 13/007,294

(22) Filed: Jan. 14, 2011

(65) Prior Publication Data

US 2011/0179187 A1    Jul. 21, 2011

(30) Foreign Application Priority Data

Jan. 20, 2010 (JP) .................. 2010-010202

(51) Int. Cl.
| | |
|---|---|
| G06F 15/16 | (2006.01) |
| H04L 12/751 | (2013.01) |
| H04L 29/08 | (2006.01) |
| G06F 3/06 | (2006.01) |
| H04L 12/727 | (2013.01) |

(52) U.S. Cl.
CPC ............ H04L 45/02 (2013.01); H04L 67/1097 (2013.01); G06F 3/0689 (2013.01); H04L 45/121 (2013.01)

(58) Field of Classification Search
USPC ................ 709/236, 230, 232, 234, 235, 248; 370/77, 105.1, 229
See application file for complete search history.

(56) References Cited

U.S. PATENT DOCUMENTS

| | | | |
|---|---|---|---|
| 6,014,383 A * | 1/2000 | McCarty ...................... | 370/453 |
| 7,213,090 B2 | 5/2007 | Ishida et | |
| 7,406,034 B1 * | 7/2008 | Cometto et al. .............. | 370/218 |

(Continued)

FOREIGN PATENT DOCUMENTS

| | | |
|---|---|---|
| JP | 62-266943 A | 11/1987 |
| JP | 2005-78523 A | 3/2005 |

(Continued)

OTHER PUBLICATIONS

Cherkasova, Ludmila, et al. (Jan. 1996). Fibre channel fabrics: Evaluation and design. In System Sciences, 1996., Proceedings of the Twenty-Ninth Hawaii International Conference on, (vol. 1, pp. 53-62). IEEE.*

(Continued)

*Primary Examiner* — Kristie Shingles
*Assistant Examiner* — Timothy Sowa
(74) *Attorney, Agent, or Firm* — Fujitsu Patent Center

(57) ABSTRACT

A storage apparatus connectable to a computer for transmitting a frame includes a plurality of switches connected by a cascade connection, and a plurality of storages connected to the plurality of switches, wherein at least one of the plurality of switches includes a memory for storing latency value corresponding to a destination address of the frame, the destination address indicating one of the plurality of storages and the computer of a destination of the frame, the latency value indicating an amount of delaying to begin a transmission of the frame, and a port for executing a process including receiving the frame, reading out the latency value corresponding to the destination address included in the received frame from the memory, and transmitting the frame after a time corresponding to the latency value elapsed.

2 Claims, 11 Drawing Sheets

(56) References Cited

U.S. PATENT DOCUMENTS

| | | | |
|---|---|---|---|
| 7,600,035 B2* | 10/2009 | Lalsangi et al. | 709/234 |
| 8,095,760 B2 | 1/2012 | Mizuno et al. | |
| 2001/0008531 A1* | 7/2001 | Lanigan et al. | 370/432 |
| 2005/0018603 A1* | 1/2005 | Dropps et al. | 370/229 |
| 2005/0089054 A1* | 4/2005 | Ciancaglini et al. | 370/412 |
| 2009/0147673 A1 | 6/2009 | Niigata | |
| 2009/0215538 A1* | 8/2009 | Jew | 463/42 |
| 2009/0296705 A1* | 12/2009 | Niigata | 370/389 |
| 2010/0106816 A1* | 4/2010 | Gulati et al. | 709/223 |

FOREIGN PATENT DOCUMENTS

| | | |
|---|---|---|
| JP | 2009-140179 A | 6/2009 |
| JP | 2009-258841 A | 11/2009 |

OTHER PUBLICATIONS

Japanese Office Action mailed Sep. 10, 2013 for corresponding Japanese Application No. 2010-010202, with Partial English-language Translation.

* cited by examiner

FIG. 6A

| DEVICE ADDRESS | DISTRIBUTION DESTINATION PORT |
|---|---|
| COMPUTER 10 | 61-1 |
| STORAGE 41 | 63-1 |
| STORAGE 42 | 64-1 |
| STORAGE 43 | 62-1 |
| STORAGE 44 | 62-1 |
| STORAGE 45 | 62-1 |
| STORAGE 46 | 62-1 |

FIG. 6B

| DEVICE ADDRESS | DISTRIBUTION DESTINATION PORT |
|---|---|
| COMPUTER 10 | 61-2 |
| STORAGE 41 | 61-2 |
| STORAGE 42 | 61-2 |
| STORAGE 43 | 63-2 |
| STORAGE 44 | 64-2 |
| STORAGE 45 | 62-2 |
| STORAGE 46 | 62-2 |

FIG. 6C

| DEVICE ADDRESS | DISTRIBUTION DESTINATION PORT |
|---|---|
| COMPUTER 10 | 61-3 |
| STORAGE 41 | 61-3 |
| STORAGE 42 | 61-3 |
| STORAGE 43 | 61-3 |
| STORAGE 44 | 61-3 |
| STORAGE 45 | 63-3 |
| STORAGE 46 | 64-3 |

FIG. 7A

| DEVICE ADDRESS | DISTRIBUTION DESTINATION PORT | LATENCY SET VALUE |
|---|---|---|
| COMPUTER 10 | 61-1 | 2L |
| STORAGE 41 | 63-1 | 2L |
| STORAGE 42 | 64-1 | 2L |
| STORAGE 43 | 62-1 | L |
| STORAGE 44 | 62-1 | L |
| STORAGE 45 | 62-1 | 0 |
| STORAGE 46 | 62-1 | 0 |

FIG. 7B

| DEVICE ADDRESS | DISTRIBUTION DESTINATION PORT | LATENCY SET VALUE |
|---|---|---|
| COMPUTER 10 | 61-2 | L |
| STORAGE 41 | 61-2 | 0 |
| STORAGE 42 | 61-2 | 0 |
| STORAGE 43 | 63-2 | 0 |
| STORAGE 44 | 64-2 | 0 |
| STORAGE 45 | 62-2 | 0 |
| STORAGE 46 | 62-2 | 0 |

FIG. 7C

| DEVICE ADDRESS | DISTRIBUTION DESTINATION PORT | LATENCY SET VALUE |
|---|---|---|
| COMPUTER 10 | 61-3 | 0 |
| STORAGE 41 | 61-3 | 0 |
| STORAGE 42 | 61-3 | 0 |
| STORAGE 43 | 61-3 | 0 |
| STORAGE 44 | 61-3 | 0 |
| STORAGE 45 | 63-3 | 0 |
| STORAGE 46 | 64-3 | 0 |

STORAGE APPARATUS, SWITCH AND STORAGE APPARATUS CONTROL METHOD

CROSS-REFERENCE TO RELATED APPLICATION

This application is based upon and claims the benefit of priority of the prior Japanese Patent Application No. 2010-010202, filed on Jan. 20, 2010 the entire contents of which are incorporated herein by reference.

FIELD

The embodiments discussed herein are related to a storage apparatuses.

BACKGROUND

For example, in a general storage system such as a RAID (Redundant Arrays of Inexpensive Disks) system, a plurality of switches are provided between a computer and storages to construct a storage network for communication. The communication is implemented by transmission and reception of frames containing data between a computer and storages through a switch.

FIG. 11 schematically illustrates a hardware configuration example of a storage system 200 in the past. A computer 100 reads data from storages 410 to 460 and writes data to the storages 410 to 460. Enclosures 210-1 to 210-3 are drive enclosures (DE) containing one or more storages. The enclosure 210-1 includes a switch 310-1 and storages 410 and 420, and the enclosure 210-2 includes a switch 310-2 and storages 430 and 440. The enclosure 210-3 includes a switch 310-3 and storages 450 and 460. When acquiring frames, the switches 310-1 to 310-3 route the frames to the destinations of the frames.

Japanese Laid-open Patent Publication No. 2009-140179 is an example of related art.

However, the storage system in the past has a problem of occurrence of performance imbalance due to different arrival times (latencies) of frames from a computer to storages due to the differences in positions of the storages.

The occurrence of the problem will be described more specifically.

With reference to the example illustrated in FIG. 11, the case will be considered in which the computer 100 sends a frame to the storage 410. The frame transmitted from the computer 100 is received by the switch 310-1 via a cable 510. In the switch 310-1, the frame is routed to the storage 410 and reaches the storage 410. In this case, the transmission of the frame from the computer 100 to the storage 410 requires the time for passing the frame through the cable 510 and the time for routing the frame within the switch 310-1.

Next, the case will be considered in which the computer 100 transmits a frame to the storage 430, for example. The frame transmitted from the computer 100 is received by the switch 310-1 via the cable 510. In the switch 310-1, the frame is routed to transmit to the switch 310-2. The routed frame is received by the switch 310-2 via the cable 520. In the switch 310-2, the frame is routed to the storage 430 and reaches the storage 430. In this case, the transmission of the frame from the computer 100 to the storage 430 requires the time for passing through the cable 510 and cable 520 and the time for routing within the switch 310-1 and switch 310-2.

In other words, in accordance with positions of the switches 310-1 to 310-3 to which the storages 410 to 460 belong, the arrival times of the frame from the computer 100 to the storages 410 to 460 differ. Also in the case that a frame is transmitted from the storages 410 to 460 to the computer 100, the arrival times of a frame from the storages 410 to 460 to the computer 100 differ in accordance with the switches 310-1 to 310-3 to which the storages 410 to 460 belong.

This results in different processing times for storage reading processing (Read) or storage writing processing (Write) in which many frames are transmitted and received. Performance imbalance may be caused by different processing times according to the positions of storages even when the same processing is performed on the storages.

The performance imbalance refers to a processing time bias caused by different latencies occurring even when the same processing is performed simultaneously on the storage 410 under the switch 310-1 and the storage 430 under the switch 310-2 in FIG. 11, for example. In other words, it appears that the storage 410 having a shorter transmission distance from the computer 100 has higher performance while the storage 430 has lower performance.

The performance imbalance may cause what is called command sinking in which a command to the storage 430 is not processed within an expected period of time, and its time is up.

The performance imbalance may be avoided by a system manager by setting and controlling for preventing performance reduction or by a program which controls storages on the computer 100 by performing additional processing such as performance management. However, it may take much expense in time and labor, or the program may get complicated. Particularly, when many storages are multi-cascaded and thus cause large variations in latency, manual setting or creation of a program which performs sufficient processing therefor is difficult.

SUMMARY

According to an aspect of the invention, a storage apparatus connectable to a computer for transmitting a frame includes a plurality of switches connected by a cascade connection, and a plurality of storages connected to the plurality of switches, wherein at least one of the plurality of switches includes a memory for storing latency value corresponding to a destination address of the frame, the destination address indicating one of the plurality of storages and the computer of an destination of the frame, the latency value indicating an amount of delaying to begin a transmission of the frame, and a port for executing a process including receiving the frame, reading out the latency value corresponding to the destination address included in the received frame from the memory, and transmitting the frame after a time corresponding to the latency value elapsed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A to 6C illustrate examples of routing tables in a storage system according to an example of an embodiment;

FIGS. 7A to 7C illustrate examples of latency tables in a storage system according to an example of an embodiment;

DESCRIPTION OF EMBODIMENTS

Hereinafter, there will be described embodiments according to a storage apparatus, a switch and a storage apparatus control method of the present case with reference to drawings.

[A] Description of Embodiments

Figure 1:
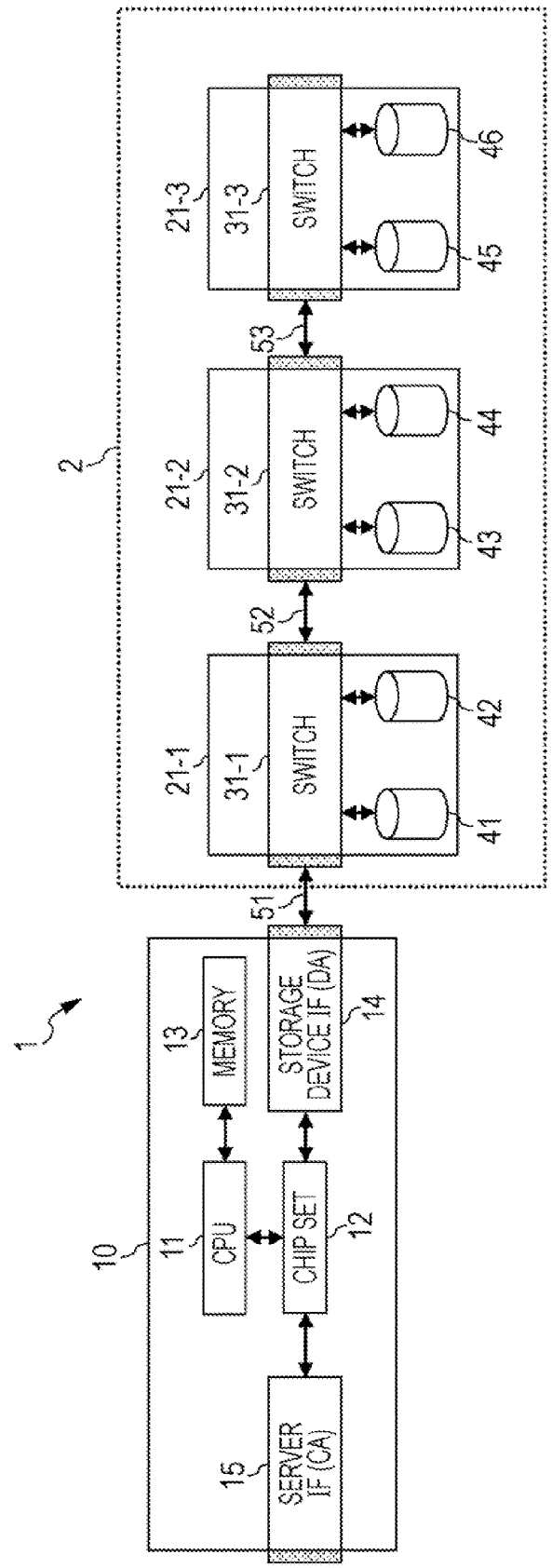
FIG. 1 schematically illustrates a storage system according to an example of an embodiment.
Figure 2:
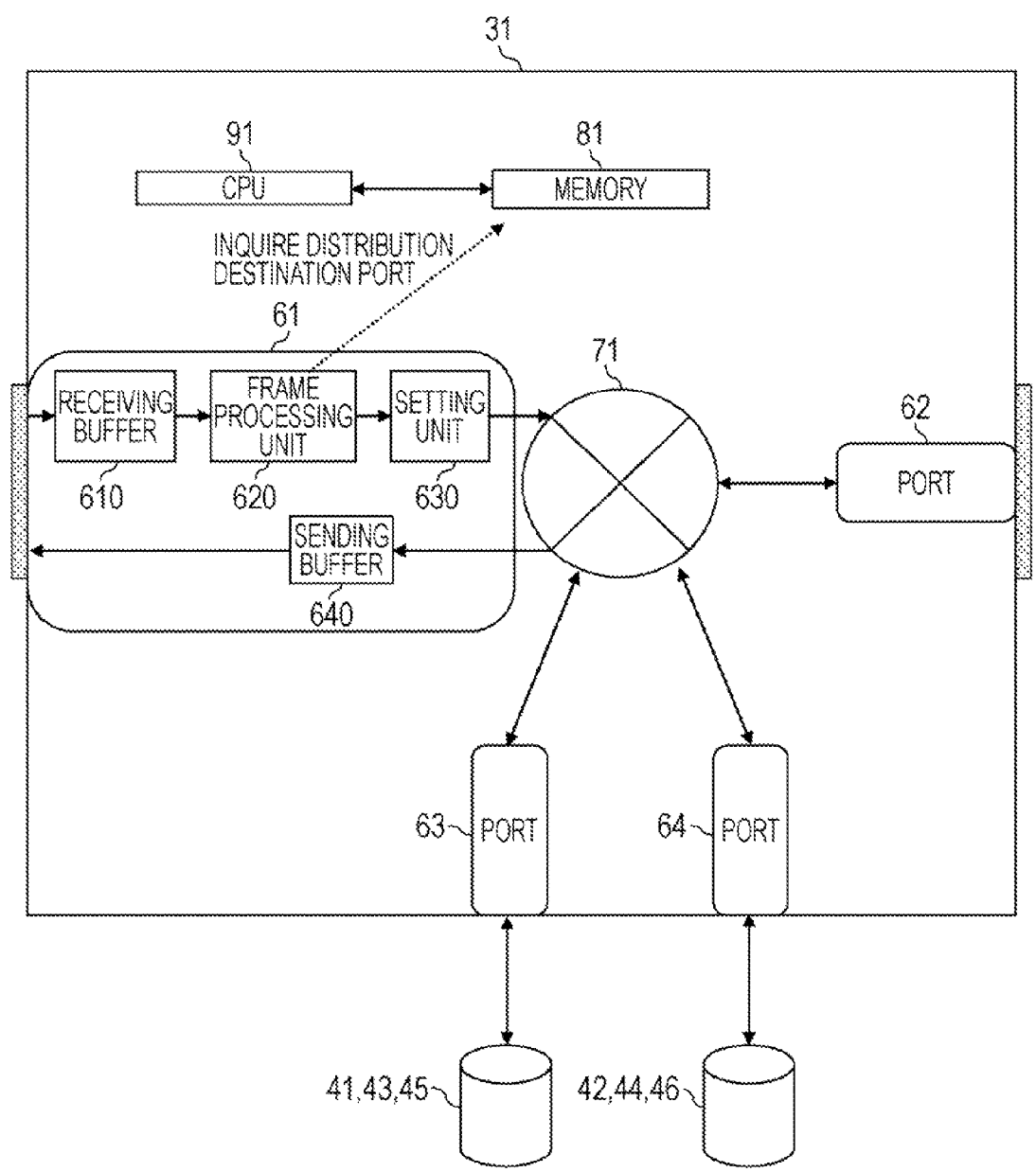
FIG. 2 schematically illustrates detail configurations of a switch in a storage system according to an example of an embodiment.

FIG. 1 schematically illustrates a storage system according to an example of an embodiment, and FIG. 2 schematically illustrates detail configurations of a switch therein.

A storage system 1 illustrated in FIG. 1 includes a computer 10 and a storage apparatus 2. The storage system 1 may be a RAID apparatus, for example, and may be connected to a server and/or host computer (information processing apparatus), not illustrated, and provide a storage area to the server and/or host computer.

The storage apparatus 2 is communicably connected to the computer 10 via a cable 51. The storage apparatus 2 includes a plurality of cascade-connected DEs 21-1 to 21-3. The DE 21-1 and DE 21-2 and the DE 21-2 and DE 21-3 are communicably connected in series via a cable 52 and a cable 53, respectively. In an example of this embodiment, the cables 51 to 53 have an equal length, and a frame may be propagated via the cables 51 to 53 in an equal time.

Each of the DEs 21-1 to 21-3 is an additional enclosure containing one or more storages, for example, and providing its storage area to a server and/or a host computer. The DE 21-1 includes a switch 31-1 and storages 41 and 42. The DE 21-2 includes a switch 31-2 and storages 43 and 44, and the DE 21-3 includes a switch 31-3 and storages 45 and 46. In this way, the DEs 21-1 to 21-3 have substantially the same configuration as each other.

Hereinafter, reference numerals 21-1 to 21-3 each indicating a DE will be used to refer to corresponding specific DEs of a plurality of DEs while the reference numeral 21 will be used to refer to an arbitrary DE.

Reference numerals 31-1 to 31-3 of reference numerals each indicating a switch will be used to refer to corresponding specific switches of a plurality of switches while the reference numeral 31 will be used to refer to an arbitrary switch.

The numbers (1 to N) after "-(hyphen)" in the reference numerals indicating various devices of the DE 21, switch 31, ports 61 to 64, which will be described below, and so on refer to places from the computer 10 in the cascade connection.

The storages 41 to 46 may be hard disk drives (HDDs) and store information. The storages 41 to 46 may store data of frames received from the computer 10 to their storage areas. The storages 41 to 46 transmit the data read from the storage areas as frames to the computer 10. Through the transmission of frames from the storages 41 to 46 to the computer 10, the computer 10 can acquire information stored in the storages 41 to 46. According to an embodiment of this embodiment, the storages 41 to 46 have an equal response time to frames.

The switch 31 may be an LSI (large-scale integration), for example, and selectively changes the transmission path for a frame. The switch 31 includes a plurality of ports 61 to 64, a crossbar 71, a memory 81, and a CPU 91, as illustrated in FIG. 2. According to an example of this embodiment, the routing times are equal in the switches 31-1, 31-2, and 31-3.

The crossbar 71 selectively connects between the ports 61 to 64 in accordance with an instruction from a setting unit 630, which will be described below. In other words, the crossbar 71 selectively connects between a plurality of ports to function as a switcher for setting a transmission path for a frame.

The memory 81 may be a dynamic random access memory (DRAM), for example, and stores data such as various application programs to be executed by the CPU 91, which will be described below, and a routing table (hereinafter called a latency table) having the settings of latency values, which will be described below. In other words, the memory 81 functions as a delay control information storage which stores delay control information having correspondence between a destination and a delay time for a frame.

The central processing unit (CPU) 91 is an arithmetic processing device and implements functions by executing various application programs recorded in the memory 81.

The ports 61 to 64 are interfaces to be connected to other apparatus, and may be based on a standard such as SAS (Serial Attached SCSI), for example. The ports to be connected to the storages 41 to 46 and the port to be connected to the computer 10 may be called direct ports, and the ports connecting between the switches 21 may be called cascade ports.

In the example illustrated in FIG. 2, the computer 10 or the port 62 for another switch 31 is connected to the port 61. The port 61 for another switch 31 may further be connected to the port 62. The storage 41 (43, 45) and the storage 42 (44, 46) are connected to the port 63 and port 64, respectively. In other words, each of the ports 61 to 64 functions as a port to which one of a storage, another switch of a plurality of switches and a computer is to be connected.

The ports 61 to 64 have configurations which are substantially the same, and each of the ports 61 to 64 includes a receiving buffer 610, a frame processing unit 620, a setting unit 630 and a sending buffer 640. In FIG. 2, the configuration of the port 61 is only illustrated, and the configurations of the ports 62 to 64 are omitted, for convenience of illustration.

The receiving buffer 610 may be a First In First Out (FIFO) buffer, for example, and temporarily holds frames transmitted from the computer 10, storages 41 to 46 and other switches 31.

The frame processing unit 620 is connected to the receiving buffer 610 and acquires the destination (destination address) of a frame stored in the receiving buffer 610 from the header part of the frame. The frame processing unit 620 determines the distribution destination port and latency value corresponding to the acquired destination with reference to a latency table stored in the memory 81. The frame processing unit 620 identifies the type of the frame such as whether it is a path selected frame or not with reference to the data part of a frame, which will be described below, for example.

On the basis of the distribution destination port determined by the frame processing unit 620, the setting unit 630 sets the crossbar 71 and sets the latency value determined by the frame processing unit 620 in the delay setting unit 636, which will be described below, in the distribution destination port via an internal bus, not illustrated. The sending buffer 640 may be a FIFO buffer, for example, and temporarily holds a frame received from the crossbar 71. The sending buffer 640 delays a frame in accordance with the corresponding latency value.

Figure 3:
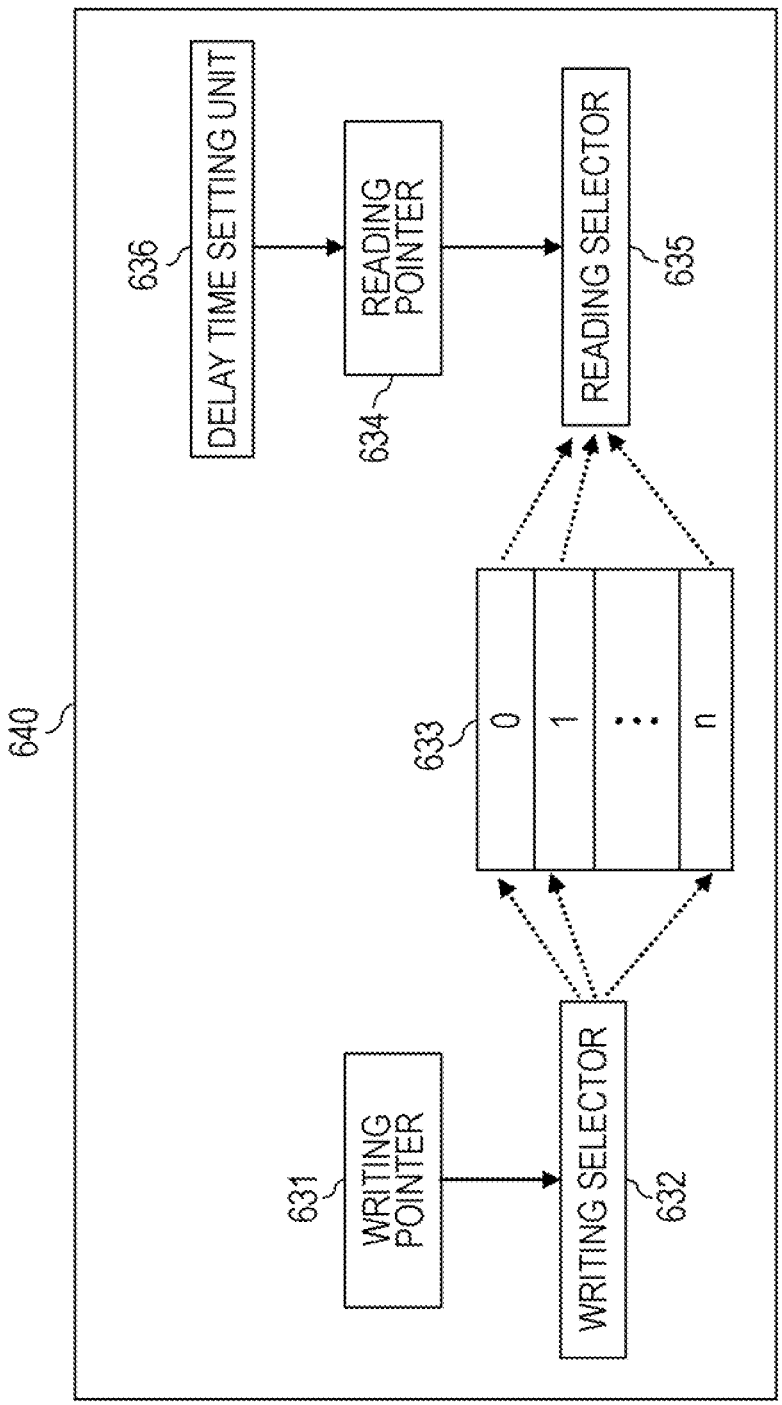
FIG. 3 schematically illustrates a configuration example of a sending buffer in a storage system according to an example of an embodiment.

FIG. 3 schematically illustrates a configuration example of the sending buffer 640. The sending buffer 640 includes a writing pointer 631, a writing selector 632, a frame memory array 633, a reading pointer 634, a reading selector 635 and a delay time setting unit 636.

The writing pointer 631 instructs the position to write in the frame memory array 633 to the writing selector 632, which will be described below. The writing pointer 631 is incremented by one every time and instructs the writing selector 632 to write in the frame memory array 633, which will be described below, in the order of receiving frames.

In response to the instruction from the writing pointer 631 and in accordance with the instruction from the writing pointer 631, the writing selector 632 selects the position to write in the frame memory array 633, which will be described below, and writes a frame received from the crossbar 71 into the frame memory array 633.

The frame memory array 633 may be a DRAM, for example, and includes a plurality of (0 to n) storage areas and stores frames in the storage areas. In other words, the frame memory array 633 functions as a storage unit which stores frames received from the crossbar 71.

The reading pointer 634 instructs the position of a frame to be read in the frame memory array 633 to the reading selector 635, which will be described below. For example, the reading pointer 634 is typically incremented at constant intervals predetermined by a hard clock, for example, and instructs the reading selector 635, which will be described below.

In response to the instruction from the reading pointer 634 and in accordance with the instruction from the reading pointer 634, the reading selector 635 selects a read position in the frame memory array 633 and reads the frame from the frame memory array 633. In other words, the reading pointer 634 and reading selector 635 functions as a reading unit which reads a frame stored in a storage unit and transmits it to one of the plurality of ports.

The delay time setting unit 636 may be one function of an LSI, for example, and holds a latency value set by the setting unit 630 in a register. On the basis of the held latency value, the delay time setting unit 636 further controls the timing of the instruction to the reading selector 635 by the reading pointer 634 and delays the reading of a frame from the frame memory array 633 by the reading selector 635. For example, the timing of the instruction to the reading selector 635 by the reading pointer 634 may be controlled by changing the hard clock period for incrementing the reading pointer 634. For example, the state in which the reading pointer 63 is incremented every hard clock one period if the latency value is equal to 0 is changed to the state in which the reading pointer 634 is incremented every hard clock X period (X>1) if the latency value is higher than 0. The delay setting unit 636 may hold in a register, not illustrated, information having correspondence between the set latency value and the hard clock period for incrementing the reading pointer 634. In this case, on the basis of the information and the set latency value, the delay time setting unit 636 changes the hard clock period for incrementing the reading pointer 634. In other words, the delay time setting unit 636 functions as a delay control unit which delays the transmission of a frame by controlling the timing for reading a frame by the reading unit.

The frame memory array 633, reading pointer 634, reading selector 635 and delay time setting unit 636 functions as a delay unit which delays the transmission of a frame.

The computer 10 may be a controller module, for example, and transmits and receives a frame to perform processing such as reading processing (Read) on data stored in the storages 41 to 46 and writing processing (Write) on data to the storages 41 to 46. In other words, the computer 10 functioning as an initiator issues a command to a target one of the storages 41 to 46 to exchange data between devices. The computer 10 further recognizes a topology of the entire storage system 1 and thus creates a latency table, which will be described below. A command or data is transmitted and received in a frame form.

As illustrated in FIG. 1, the computer 10 includes a CPU 11, a chip set 12, a memory 13, a storage-side interface 14, and a server-side interface 15.

The chip set 12 may be a bridge chip which connects the CPU 11, storage-side interface 14 and server-side interface 15, which will be described below, for example.

The CPU 11 is an arithmetic processing unit and implements functions by executing various application programs recorded in the memory 13, which will be described below. For example, the CPU 11 transmits a frame to the storage apparatus 2. The CPU 11 recognizes a topology of the entire storage system 1 and, on the basis of the recognized topology, creates routing tables for the switches 31 having correspondence between destinations of frames and distribution destination ports 61 to 64 according to the destinations. The CPU 11 further acquires the latencies between the computer 10 and the storages 41 to 46 included in the storage apparatus 2 and, on the basis of the acquired latencies, creates latency tables for the switches 31. The CPU 11 further transmits a frame to the storage apparatus 2 and receives a frame transmitted from the storage apparatus 2.

In other words, the CPU 11 implements a topology identification function which identifies a topology of the entire storage system 1. The CPU 11 further implements a routing table creating function which creates a routing table for each of the switches 31 having correspondence between the destinations of frames and the distribution destination ports 61 to 64 according to the destinations. The CPU 11 further implements a latency calculation function which acquires latencies between the computer 10 and the storages 41 to 46 included in the storage apparatus 2. The CPU 11 further implements a latency table creating function which creates a latency table for each of the switches 31 having correspondence between the destinations of frames, the distribution destination ports 61 to 64 according to the destinations and latency values.

The topology identification function may be implemented by performing Discovery processing, for example, and grasps a topology of the entire storage system 1. The topology identification function may be implemented by using various known methods, and the detail descriptions will be omitted.

On the basis of the topology of the storage system 1 grasped by the topology identification function, the routing table creating function may create a routing table for each of the switches 31 between the destinations of frames and the ports 61 to 64, for example. The routing table creating function may be implemented by using various known methods, and the detail descriptions will be omitted.

The latency calculation function may, for example, calculate the latencies by measuring times from the transmission of frames from the computer 10 to the storages 41 to 46 in the storage apparatus 2 to the reception of responses to the frames by the computer 10. More specifically, the latency calculation function determines the half of the time from the transmission of frames to the reception of responses to the frames by the computer 10. In other words, the latency calculation function determines latencies on the basis of the transmission paths between the computer 10 and the storages 41 to 46.

If the times required for transmission and reception of frames between the storages 41 and 42 connecting to one switch 31 (such as switch 31-1) and the computer 10 are different, the latency may be determined by using a representative value (such as a maximum value, a minimum value, and an average value) of the times required for the transmission and reception of frames.

The latency calculation function may further logically determine the latencies between the computer 10 and the storages 41 to 46 on the basis of the transmission rates of cables 51 to 53 between the computer 10 and the storages 41 to 46 and processing times required for routing in the switches 31. The processing time required for routing in the switches 31 may be grasped in accordance with the components such as an LSI (large scale integration) included in the switches 31.

Without transmitting frames from the computer 10 to the storages 41 to 46, the latencies may be acquired by transmitting a frame from the computer 10 to at least one storage (storage 45 or storage 46 in FIG. 1) under the farthest switch 31-3 on the connection path. Since the topology of the entire storage system 1 is grasped by the topology identification function, the latency of one switch may be acquired by dividing the acquired latencies by the number N of cascades of the switches 31. The latency for one switch refers to the sum of the time for propagating a frame through any one cable of the cables 51 to 53 and the time for routing the frame within the switch 31, for example.

Without transmitting frames from the computer 10 to the storages 41 to 46, the latencies may be acquired by transmitting a frame from the computer 10 to at least one storage (storage 41 or storage 42 in FIG. 1) under the closest switch 31-1 on the connection path. Since the topology of the entire storage system 1 is grasped by the topology identification function, the latency between the computer 10 and the storages 45 and 46, that is, a maximum latency or the like may be acquired by multiplying the acquired latency by the number N of cascades of the switches 31. In other words, a frame may be transmitted to an arbitrary storage under an arbitrary switch 31, and the latency may be acquired. On the basis of the acquired latency and the number of cascades of the switches 31, a latency for one switch, a maximum latency or the like may be acquired. In other words, on the basis of the acquired latency and the position of the switch 31 to which an arbitrary storage belongs on a connection path from the computer 10, a latency for one switch, a maximum latency or the like may be acquired.

The latency table creating function creates a latency table for each of the switches 31 on the basis of the corresponding latency acquired by the latency calculation function, for example.

For example, if N switches 31 are cascade-connected to the computer 10, latencies are set in the routing tables for the switches 31 as follows. In this case, L is a latency for one switch, and the switch 31 at an arbitrary position on a connection path represents the nth switch. n is a natural number and indicates the place from the computer 10 on the connection path.

(I) Latency Table (n = 1) for First Switch

Entry of Computer 10: Maximum Latency L
Entry of Storage within First Switch 31-1: Maximum Latency L
Entry of Storage within Second Switch 31-2: Maximum Latency 2 × L
.
.
.
Entry of Storage within Nth Switch 31-N: Maximum Latency N × L = 0

(II) Latency Table for Second and Subsequent Switches (2 ≤ n ≤ N)

Entry of Computer 10: Maximum Latency n × L
Entry of Storage within First Switch 31-1: 0
Entry of Storage within Second Switch 31-2: 0
.
.
.
Entry of Storage within Nth Switch 31-N: 0

That is, on a latency table for the first switch, the latency values set for frames to be transmitted to the storages 41 to 46 are inversely proportional or substantially inversely proportional to the number of the switches 31 between the computer 10 and the destination storages of the frames. In other words, the latency values set for frames to be transmitted to the storages 41 to 46 decrease as the transmission times of the frames on the transmission path increase. On the other hand, on the latency table for the first switch, the latency value set for frames to be transmitted to the computer 10 is equal to a maximum value of the latency values set for frames to be transmitted to the storages 41 to 46. In other words, the latency value set for frames to be transmitted to the computer 10 is equal to a maximum value of the latency values for the frame transmission between the computer 10 and the storages 41 to 46. On the latency tables for the first to Nth switch, the latency value set for frames to be transmitted to the computer 10 is inversely proportional or substantially inversely proportional to the number of switches 31 between the computer 10 and source storages. In other words, the latency values set for frames to be transmitted to the computer 10 decrease as the frame transmission times on the transmission path increase. On the latency tables for the second to Nth switches, the latency values set for frames to be transmitted to the storages 41 to 46 are equal to 0.

The memory 13 may be a DRAM, for example, and stores various application programs to be executed by the CPU 11 and/or data. The memory 13 temporarily stores latency tables created in the computer 10. The memory 13 may be connected to the CPU 11 through a what-is-called north bridge or may be directly connected to the CPU 11.

The storage interface (IF) 14 may be a device adapter (DA), for example, and the storage apparatus 2 is connected thereto.

The server interface (IF) 15 may be a channel adapter (CA), for example, and a server and/or a host computer is/are connected thereto.

Figure 4:
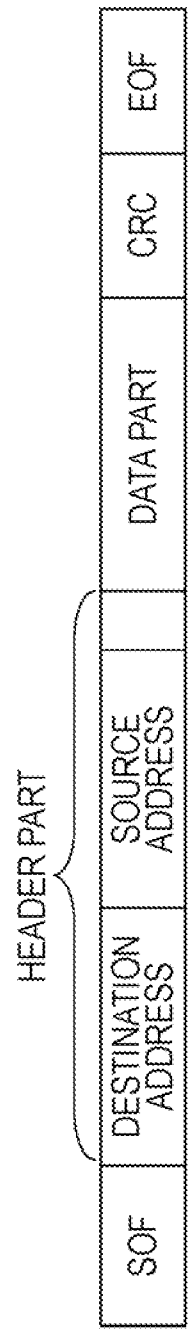
FIG. 4 schematically illustrates a configuration of a frame to be transmitted and received in a storage system according to an example of an embodiment.

FIG. 4 illustrates an example of a data structure of a frame to be transmitted and received between the computer 10 and the storages 41 to 46. As illustrated in FIG. 4, the frame includes an SOF (Start Of Frame) indicating the beginning of the frame, a header part containing a destination address and a source address, and a data part containing data such as information describing the type of the frame such as a path selected frame. The frame further contains a CRC (Cyclic Redundancy Check) indicating protection check code for the frame data and an EOF (End Of Frame) indicating the end of the frame. The frame processing unit 620 identifies the destination of a frame with reference to the destination address contained in the header part of the frame.

Figure 5:
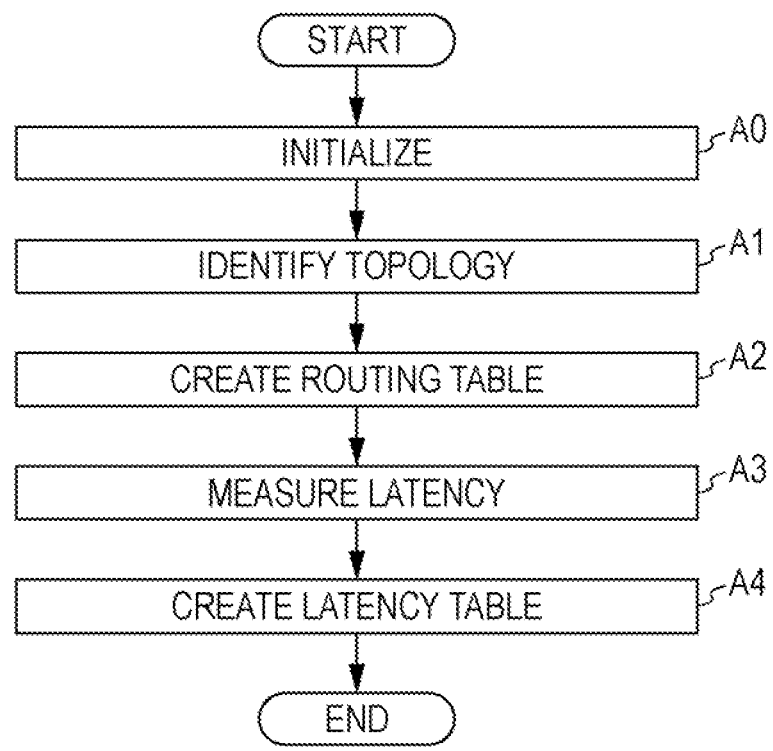
FIG. 5 is a flowchart describing processing in a storage system according to an example of an embodiment.

An operation of processing of creating a latency table in the storage system 1 having the configuration as described above which is an example of this embodiment will be described with reference to the flowchart (A0 to A4) illustrated in FIG. 5.

First of all, for example, if the storage system 1 is initialized (A0) by the start of the storage system 1 or a hot-swap event, the computer 10 uses the topology identification function to grasp the topology of the storage system 1 (A1). On the basis of the topology grasped by the topology identification function, the computer 10 creates for switches 31 routing tables each having correspondence between device addresses and distribution destination ports (A2). FIGS. 6A to 6C illustrate examples of the routing tables created in A1. FIGS. 6A to 6C are routing tables for the switches 31-1 to 31-3, respectively.

Next, the computer 10 uses the latency calculation function to acquire latencies between the computer 10 and the storages 41 to 46 (A3). On the basis of the latencies acquired in A3 by the latency table creating function, the computer 10 creates latency tables for the switches 31 (A4). Each of the latency tables may be created by associating latency values with the device addresses (frame destinations) in addition to the routing tables created in A2. FIGS. 7A to 7C illustrate examples of the latency tables created in A4. FIGS. 7A to 7C are latency tables for switches 31-1 to 31-3. In other words, the latency tables illustrated in FIGS. 7A to 7C are extensions of the routing tables illustrated in FIGS. 6A to 6C.

The created latency tables are transmitted from the computer 10 to the switches 31, and the switches 31 store the created latency tables to the memory 81. More specifically, the switches 31-1, 31-2 and 31-3 store the latency tables illustrated in FIGS. 7A, 7B and 7C, respectively. After that, in accordance with the latency tables stored in the switches 31, the routing of frames are started between the computer 10 and the storages 41 to 46.

Figure 8:
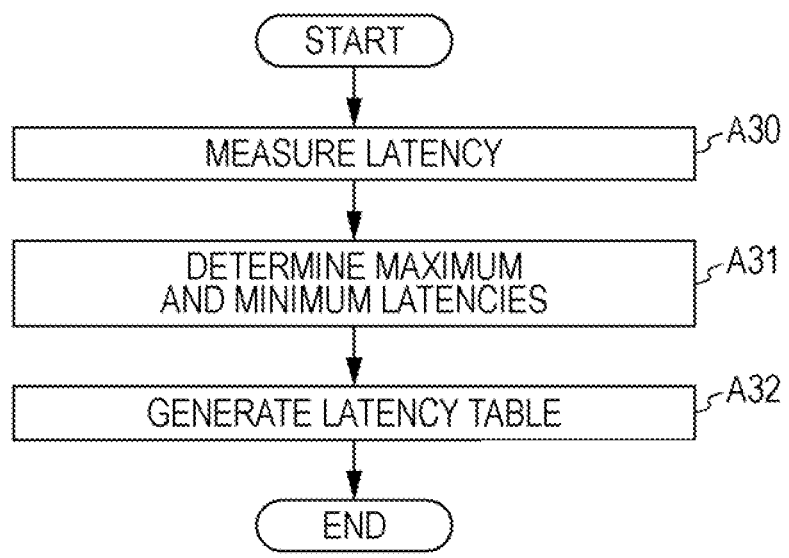
FIG. 8 is a flowchart describing creation of a latency table in a storage system according to an example of an embodiment.

Next, details of creating latency tables, that is, detail operations of A3 and A4 in FIG. 5 will be described with reference to the flowchart (A30 to A32) illustrated in FIG. 8.

First of all, with the latency calculation function, the computer 10 transmits frames to the storages 41 to 46, receives the responses to the frames and thus measures the latencies between the computer 10 and the storages 41 to 46 (A30). Next, from the latencies determined by the latency calculation function, a maximum latency and a minimum latency (latency L for one switch) is determined (A31). According to an example of this embodiment, the maximum latency is the latency between the computer 10 and the storages 45 and 46 under the switch 31-3 and is the sum of the transmission times via the cables 51 to 53 and the routing times in the switches 31-1 to 31-3. The minimum latency L is the latency between the computer 10 and the storages 41 and 42 under the switch 31-1, that is, the sum of the transmission time via the cable 51 and the routing time in the switch 31-1.

For example, if routing times of the three switches 31-1, 31-2, and 31-3 are equal, the maximum latency is three times (3L) of the minimum latency. On the basis of the maximum latency and minimum latency, latency tables are created for the switches 31 (A32). For example, a latency table is created as follows. According to an example of this embodiment, a latency table for the switch 31-1 has correspondence between entries of the storages 41 and 42 and 2L which is equal to the difference between the maximum latency 3L and the minimum latency L.

(i) Latency Table for Switch 31-1

Entry for Computer 10: Maximum Latency L
Entry for Storages 41 and 42: Maximum Latency L
Entry for Storages 43 and 44: Maximum Latency 2 × L
Entry for Storages 45 and 46: Maximum Latency 3 × L = 0
(ii) Latency Table for Switch 31-2

Entry for Computer 10: Maximum Latency 2 × L
Entry for Storages 41 and 42: 0
Entry for Storages 43 and 44: 0
Entry for Storages 45 and 46: 0
(iii) Latency Table for Switch 31-3

Entry for Computer 10: Maximum Latency 3 × L = 0
Entry for Storages 41 and 42: 0
Entry for Storages 43 and 44: 0
Entry for Storages 45 and 46: 0

The computer 10 then transmits the created latency tables to the corresponding switches 31, and the switches 31 store the latency tables in the memory 81.

Figure 9:
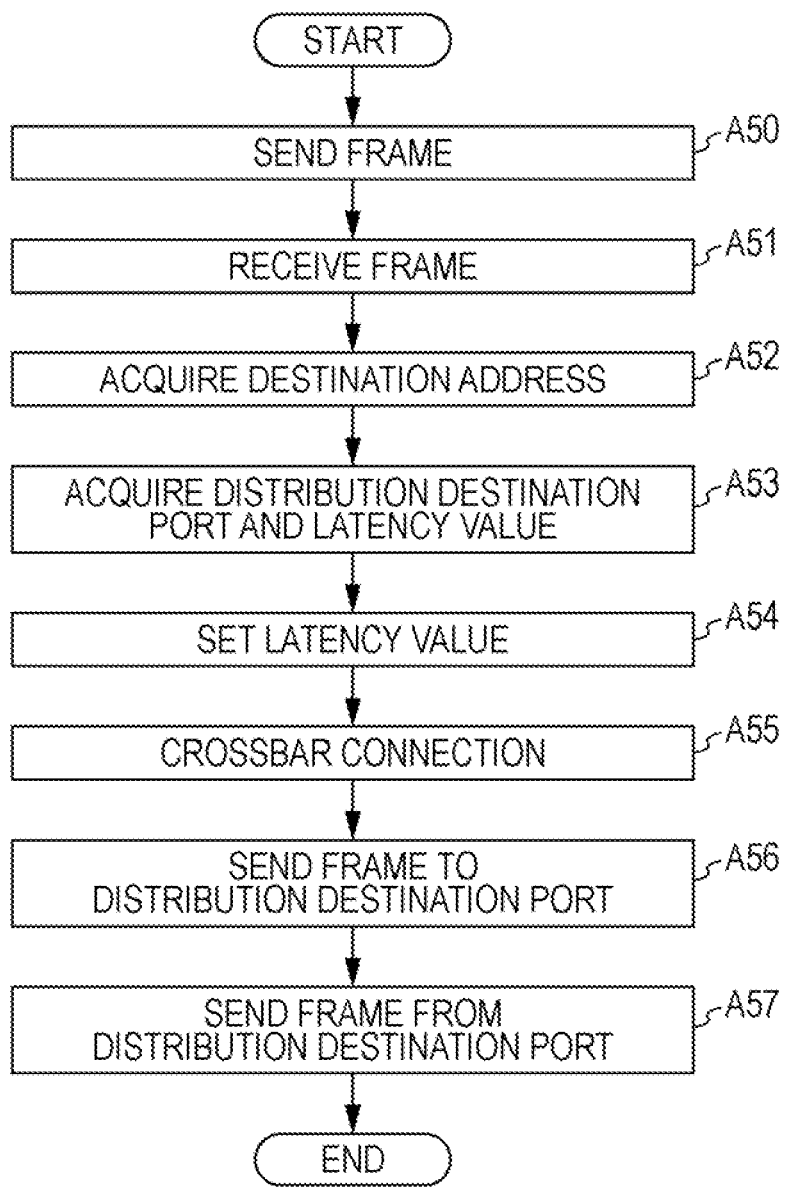
FIG. 9 is a flowchart describing routing processing in a storage system according to an example of an embodiment.

Next, details of routing of frames to be performed between the computer 10 and the storages 41 to 46, that is, detail operations of A5 in FIG. 5 will be described with reference to the flowchart illustrated in FIG. 9 (A50 to A57).

First of all, the computer 10 or storages 41 to 46 transmits or transmit a frame (A50). The transmitted frame is received by one port of the ports 61 to 64 of the switches 31 (A51). The frame processing unit 620 in the receiving port acquires the destination address of the frame (A52). The frame processing unit 620 in the receiving port further determines the distribution destination port and latency value corresponding to the destination address with reference to the routing table (A53). The setting unit 630 in the receiving port sets the latency value determined in A53 by the frame processing unit 620 to the delay time setting unit 636 in the distribution destination port determined in A53 by the frame processing unit 620 (A54). The port having received the frame and the distribution destination port determined in A53 are connected through the crossbar 71 (A55), and the frame is transmitted through the crossbar 71 to the distribution destination port (A56). The transmitted frame is delayed by the latency value determined in A53 in the sending buffer 640 in the distribution destination port determined in A53 and is then transmitted from the distribution destination port (A57). For example, the switch transmits the frame after a time corresponding to the latency value elapsed.

Performing the processing in A51 to A57 in the switches 31 allows routing of frames with an equal latency between the computer 10 and the storages 41 to 46. Having described that in A53 the routing tables are typically referenced to determine the distribution destination port and latency value corresponding to the destination address, the present technology is not limited thereto. If the port having received the frame is a cascade port, the frame processing unit 620 may determine that the latency value is equal to 0 without determining the latency value from the latency table. The cascade port is connected to the switches 31 or the computer 10. If the port having received the frame is a direct port, the frame processing unit 620 may determine that the latency value from the latency table. The direct port is connected to the storages 41 to 46.

Figure 10:
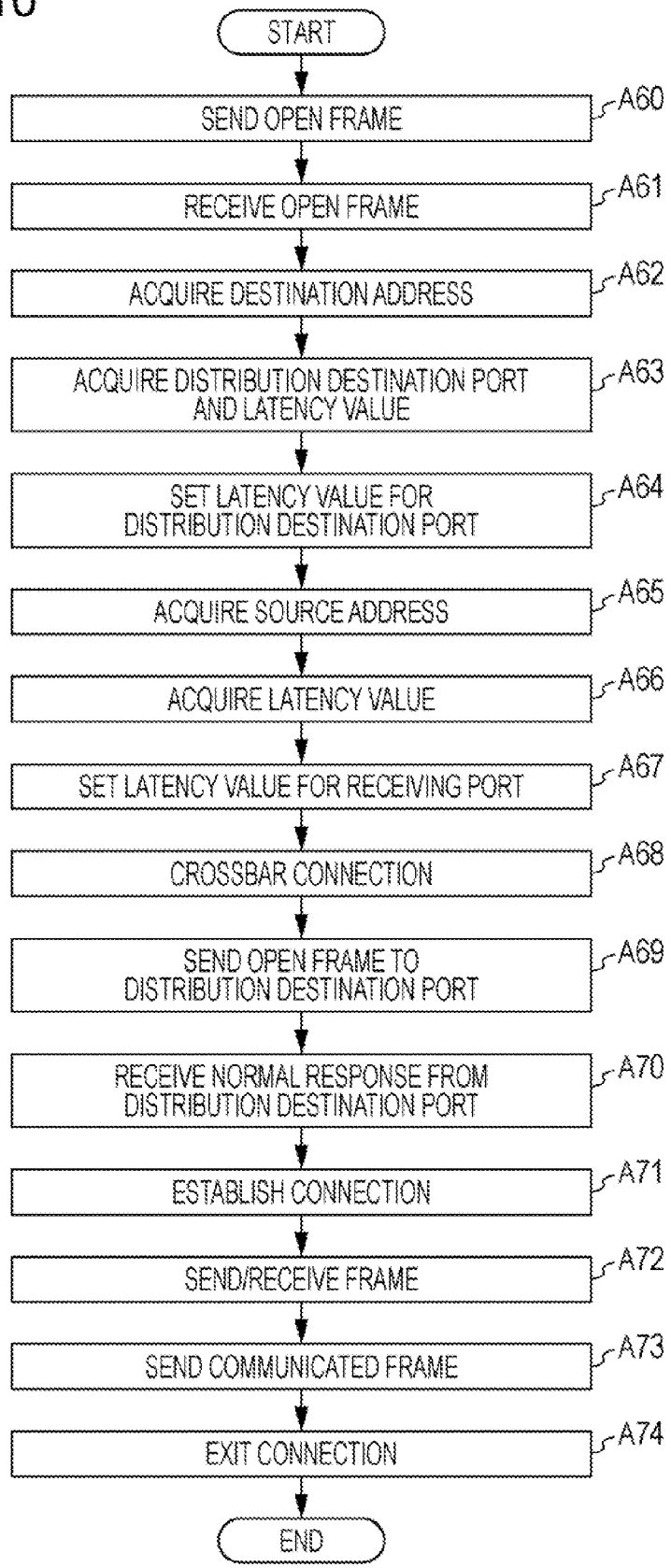
FIG. 10 is a flowchart describing routing processing in a storage system according to an example of an embodiment.
Figure 11:
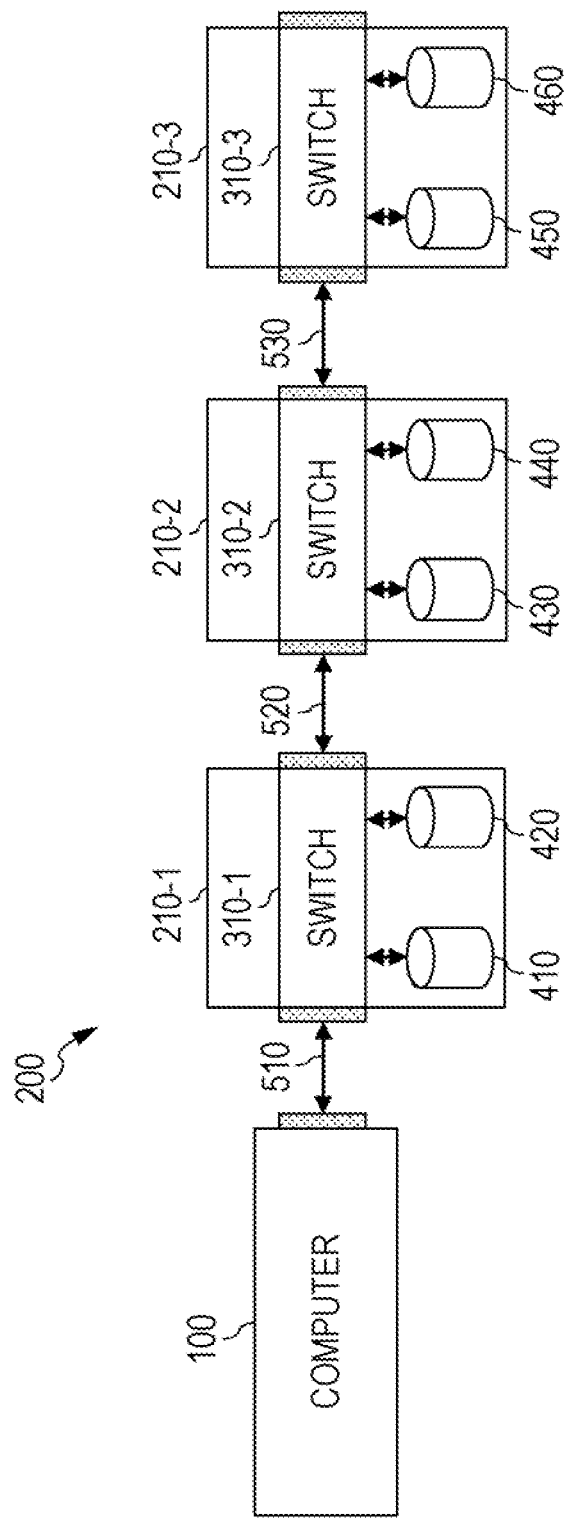
FIG. 11 schematically illustrates a storage system in the past.

According to the standard such as SAS, a connection is established with a path selected frame (OPEN frame in SAS) before starting communication, without performing frame routing processing every time a frame is received. In this case, instead on A50 to A57 above, processing in A60 to A74 illustrated in FIG. 10, for example, is performed.

First of all, the computer 10 or storages 41 to 46 transmits or transmit a path selected frame (A60). The transmitted path selected frame is received by one port of the ports 61 to 64 of the switch 31 (A61). The frame processing unit 620 in the receiving port acquires the destination address of the path selected frame (A62). With reference to the routing table, the frame processing unit 620 in the receiving port determines the distribution destination port and latency value corresponding to the destination address (A63). The setting unit 630 in the receiving port sets the latency value determined in A63 by the frame processing unit 620 to the delay time setting unit 636 in the distribution destination port determined in A63 by the frame processing unit 620 (A64). The frame processing unit 620 in the receiving port acquires the source address of the path selected frame (A65). The frame processing unit 620 in the receiving port determines the latency value corresponding to the source address with reference to the routing table (A66). The setting unit 630 in the receiving port sets the latency value determined in A66 by the frame processing unit 620 to the delay time setting unit 636 in the receiving port (A67). The port having received the path selected frame and the distribution destination port determined in A63 is connected through the crossbar 71 (A68), and the path selected frame is transmitted through the crossbar 71 to the distribution destination port (A69). If the source of the path selected frame receives a normal response to the transmitted path selected frame, the connection is established and the connection relationship is maintained (A70 and A71). After the connection is established, frames are transmitted and received between the source of the path selected frame and the destination of the path selected frame (A72). The computer 10 exits the connection by transmitting the communication end frame (A73 and A74).

The latency when a frame is transmitted from the computer 10 to the storages 41 to 46 and the latency when a frame is transmitted from the storages 41 to 46 to the computer 10 will be described below. The switches 31 hold latency tables illustrated in FIGS. 7A to 7C.

(1) When Frame is Transmitted from Computer 10 to Storage 41 (42)

The frame transmitted from the computer 10 is first received by the port 61-1 of the switch 31-1 through the cable 51. The frame processing unit 620 in the port 61-1 acquires the frame destination of the received frame to read that the frame is destined to the storage 41. Next, the frame processing unit 620 in the port 61-1 retrieves the entry for the storage 41 from the latency table held by the switch 31-1 and reads that the distribution destination port is the port 63-1 and the latency value is equal to 2L. The setting unit 630 in the port 61-1 sets the latency value 2L to the delay time setting unit 636 in the port 63-1, and the setting unit 630 in the port 61-1 sets the crossbar 71 to connect the ports 61-1 and 63-1. When the ports 61-1 and 63-1 are connected through the crossbar 71, the frame is transmitted to the port 63-1. The frame is delayed by 2L in the sending buffer 640 in the port 63-1, is then transmitted from the port 63-1 to the storage 41 and reaches the storage 41. Thus, the latency of the transmission of the frame from the computer 10 to the storage 41 is equal to the sum of the latency L for one switch 31-1 and the delay time 2L in the sending buffer 640 in the port 63-1, that is 3L.

The transmission of a frame from the computer 10 to the storage 42 is only different in that the distribution destination port of the switch 31-1 is the port 64-1 instead of the port 63-1. Thus, the latency of the transmission of a frame from the computer 10 to the storage 42 is equal to 3L which is equal to that for the transmission of a frame from the computer 10 to the storage 41.

(2) When Frame is Transmitted from Computer 10 to Storage 43 (44)

The frame transmitted from the computer 10 is first received by the port 61-1 of the switch 31-1 through the cable 51. The frame processing unit 620 in the port 61-1 acquires the frame destination of the received frame to read that the frame is destined to the storage 43. Next, the frame processing unit 620 in the port 61-1 retrieves the entry for the storage 43 from the latency table held by the switch 31-1 and reads that the distribution destination port is the port 62-1 and the latency value is equal to L. The setting unit 630 in the port 61-1 sets the latency value L to the delay time setting unit 636 in the port 62-1, and the setting unit 630 in the port 61-1 sets the crossbar 71 to connect the ports 61-1 and 62-1. When the ports 61-1 and 62-1 are connected through the crossbar 71, the frame is transmitted to the port 62-1. The frame is delayed by 2L in the sending buffer 640 in the port 62-1 and is then transmitted from the port 62-1 and is received by the port 61-2 of the switch 31-2 through the cable 52.

The frame processing unit 620 in the port 61-2 acquires the frame destination of the received frame to read that the frame is destined to the storage 43. Next, the frame processing unit 620 in the port 61-2 retrieves the entry for the storage 43 from the latency table held by the switch 31-2 and reads that the distribution destination port is the port 63-2 and the latency value is equal to 0. The setting unit 630 in the port 61-2 sets the latency value 0 to the delay time setting unit 636 in the port 63-2, and the setting unit 630 in the port 61-2 sets the crossbar 71 to connect the ports 61-2 and 63-2. When the ports 61-2 and 63-2 are connected through the crossbar 71, the frame is transmitted to the port 63-2. Without being delayed in the sending buffer 640 in the port 63-2, the frame is transmitted from the port 63-2 to the storage 43 and reaches the storage 43. Thus, the latency of the transmission of the frame from the computer 10 to the storage 43 is equal to the sum of the latency 2×L for two switches 31-1 and 31-2 and the delay time L in the sending buffer 640 in the port 62-1 of the switch 31-1, that is 3L.

The transmission of a frame from the computer 10 to the storage 44 is only different in that the distribution destination port of the switch 31-2 is the port 64-2 instead of the port 63-2. Thus, the latency of the transmission of a frame from the computer 10 to the storage 44 is equal to 3L which is equal to that for the transmission of a frame from the computer 10 to the storage 43.

(3) When Frame is Transmitted from Computer 10 to Storage 45 (46)

The frame transmitted from the computer 10 is received by the port 61-1 of the switch 31-1 through the cable 51. The frame processing unit 620 in the port 61-1 acquires the frame destination of the received frame to read that the frame is destined to the storage 45. Next, the frame processing unit 620 in the port 61-1 retrieves the entry for the storage 45 from the latency table held by the switch 31-1 and reads that the distribution destination port is the port 62-1 and the latency value is equal to 0. The setting unit 630 in the port 61-1 sets the latency value 0 to the delay time setting unit 636 in the port 62-1, and the setting unit 630 in the port 61-1 sets the crossbar 71 to connect the ports 62-1 and 61-2. When the ports 62-1 and 61-2 are connected through the crossbar 71, the frame is transmitted to the port 62-1. Without being delayed in the sending buffer 640 in the port 62-1, the frame is transmitted from the port 62-1 and is received by the port 61-2 of the switch 31-2 through the cable 52.

The frame processing unit 620 in the port 61-2 acquires the frame destination of the received frame to read that the frame is destined to the storage 45. Next, the frame processing unit 620 in the port 61-2 retrieves the entry for the storage 45 from the latency table held by the switch 31-2 and reads that the distribution destination port is the port 62-2 and the latency value is equal to 0. The setting unit 630 in the port 61-2 sets the latency value 0 to the delay time setting unit 636 in the port 62-2, and the setting unit 630 in the port 61-2 sets the crossbar 71 to connect the ports 61-2 and 62-2. When the ports 61-2 and 62-2 are connected through the crossbar 71, the frame is transmitted to the port 63-2. Without being delayed in the sending buffer 640 in the port 62-2, the frame is transmitted from the port 62-2 and is received by the port 61-3 of the switch 31-3 through the cable 53.

The frame processing unit 620 in the port 61-3 acquires the frame destination of the received frame to read that the frame is destined to the storage 45. Next, the frame processing unit 620 in the port 61-3 retrieves the entry for the storage 45 from the latency table held by the switch 31-3 and reads that the distribution destination port is the port 63-3 and the latency value is equal to 0. The setting unit 630 in the port 61-3 sets the latency value 0 to the delay time setting unit 636 in the port 63-3, and the setting unit 630 in the port 61-3 sets the crossbar 71 to connect the ports 61-3 and 63-3. When the ports 61-3 and 63-3 are connected through the crossbar 71, the frame is transmitted to the port 63-3. Without being delayed in the sending buffer 640 in the port 63-3, the frame is transmitted from the port 63-3 to the storage 45 and reaches the storage 45. Thus, the latency of the transmission of the frame from the computer 10 to the storage 45 is equal to the sum of the latency 3×L for three switches 31-1 to 31-3 and the delay time 0 in the sending buffer 640 in the switches 31-1 to 31-3, that is 3L.

The transmission of a frame from the computer 10 to the storage 46 is only different in that the distribution destination port of the switch 31-3 is the port 64-3 instead of the port 63-3. Thus, the latency of the transmission of a frame from the computer 10 to the storage 46 is equal to 3L which is equal to that for the transmission of a frame from the computer 10 to the storage 45.

(4) When Frame is Transmitted from Storage 41 (42) to Computer 10

The frame transmitted from the storage 41 is first received by the port 63-1 of the switch 31-1. The frame processing unit 620 in the port 63-1 acquires the frame destination of the received frame to read that the frame is destined to the computer 10. Next, the frame processing unit 620 in the port 63-1 retrieves the entry for the computer 10 from the latency table held by the switch 31-1 and reads that the distribution destination port is the port 61-1 and the latency value is equal to 2L. The setting unit 630 in the port 63-1 sets the latency value 2L to the delay time setting unit 636 in the port 61-1, and the setting unit 630 in the port 63-1 sets the crossbar 71 to connect the ports 63-1 and 61-1. When the ports 63-1 and 61-1 are connected through the crossbar 71, the frame is transmitted to the port 61-1. The frame is delayed by 2L in the sending buffer 640 in the port 61-1, is then transmitted from the port 61-1 to the computer 10 and reaches the computer 10. Thus, the latency of the transmission of the frame from the storage 41 to the computer 10 is equal to the sum of the latency L for one switch 31-1 and the delay time 2L in the sending buffer 640 in the port 61-1, that is 3L.

The transmission of a frame from the storage 42 to the computer 10 is only different in that the port that receives the frame in the switch 31-1 is the port 64-1 instead of the port 63-1. Thus, the latency of the transmission of a frame from the storage 42 to the computer 10 is equal to 3L which is equal to that for the transmission of a frame from the storage 41 to the computer 10.

(5) When Frame is Transmitted from Storage 43 (44) to Computer 10

The frame transmitted from the storage 43 is first received by the port 63-2 of the switch 31-2. The frame processing unit 620 in the port 63-2 acquires the frame destination of the received frame to read that the frame is destined to the computer 10. Next, the frame processing unit 620 in the port 63-2 retrieves the entry for the computer 10 from the latency table held by the switch 31-2 and reads that the distribution destination port is the port 61-2 and the latency value is equal to L. The setting unit 630 in the port 63-2 sets the latency value L to the delay time setting unit 636 in the port 61-2, and the setting unit 630 in the port 63-2 sets the crossbar 71 to connect the ports 63-2 and 61-2. When the ports 63-2 and 61-2 are connected through the crossbar 71, the frame is transmitted to the port 61-2. The frame is delayed by L in the sending buffer 640 in the port 61-2 and is then transmitted from the port 61-2 and is received by the port 62-1 of the switch 31-1 through the cable 52.

The frame processing unit 620 in the port 62-1 acquires the frame destination of the received frame to read that the frame is destined to the computer 10. Next, the frame processing unit 620 in the port 62-1 retrieves the entry for the computer 10 from the latency table held by the switch 31-1 and reads that the distribution destination port is the port 61-1 and the latency value is equal to 0. The setting unit 630 in the port 62-1 sets the latency value 0 to the delay time setting unit 636 in the port 61-1, and the setting unit 630 in the port 62-1 sets the crossbar 71 to connect the ports 62-1 and 61-1. When the ports 62-1 and 61-1 are connected through the crossbar 71, the frame is transmitted to the port 61-1. Without being delayed in the sending buffer 640 in the port 61-1, the frame is transmitted from the port 61-1 to the computer 10 and reaches the computer 10 through the cable 51.

Thus, the latency of the transmission of the frame from the storage 43 to the computer 10 is equal to the sum of the latency 2×L for two switches 31-1 and 31-2 and the delay time L in the sending buffer 640 in the port 61-2 of the switch 31-2, that is 3L.

The transmission of a frame from the storage 44 to the computer 10 is only different in that the port receiving the frame in the switch 31-2 is the port 64-2 instead of the port 63-2. Thus, the latency of the transmission of a frame from the storage 44 to the computer 10 is equal to 3L which is equal to that for the transmission of a frame from the storage 43 to the computer 10.

(6) When Frame is Transmitted from Storage 45 (46) to Computer 10

The frame transmitted from the storage 45 is received by the port 63-3 of the switch 31-3. The frame processing unit 620 in the port 63-3 acquires the frame destination of the received frame to read that the frame is destined to the computer 10. Next, the frame processing unit 620 in the port 63-3 retrieves the entry for the computer 10 from the latency table held by the switch 31-3 and reads that the distribution destination port is the port 61-3 and the latency value is equal to 0. The setting unit 630 in the port 63-3 sets the latency value 0 to the delay time setting unit 636 in the port 61-3, and the setting unit 630 in the port 61-1 sets the crossbar 71 to connect the ports 63-3 and 61-3. When the ports 63-3 and 61-3 are connected through the crossbar 71, the frame is transmitted to the port 61-3. After the frame is delayed by L in the sending buffer 640 in the port 61-3, the frame is transmitted from the port 61-3 and is received by the port 62-2 of the switch 31-2 through the cable 53.

The frame processing unit 620 in the port 62-2 acquires the frame destination of the received frame to read that the frame is destined to the computer 10. Next, the frame processing unit 620 in the port 62-2 retrieves the entry for the computer 10 from the latency table held by the switch 31-2 and reads that the distribution destination port is the port 61-2 and the latency value is equal to 0. The setting unit 630 in the port 62-2 sets the latency value 0 to the delay time setting unit 636 in the port 61-2, and the setting unit 630 in the port 62-2 sets the crossbar 71 to connect the ports 62-2 and 61-2. When the ports 62-2 and 61-2 are connected through the crossbar 71, the frame is transmitted to the port 61-2. Without being delayed in the sending buffer 640 in the port 61-2, the frame is transmitted from the port 61-2 to the computer 10 and is received by the port 62-1 of the switch 31-1 through the cable 52.

The frame processing unit 620 in the port 62-1 acquires the frame destination of the received frame to read that the frame is destined to the computer 10. Next, the frame processing unit 620 in the port 62-1 retrieves the entry for the computer 10 from the latency table held by the switch 31-1 and reads that the distribution destination port is the port 61-1 and the latency value is equal to 0. The setting unit 630 in the port 62-1 sets the latency value 0 to the delay time setting unit 636 in the port 61-1, and the setting unit 630 in the port 62-1 sets the crossbar 71 to connect the ports 62-1 and 61-1. When the ports 62-1 and 61-1 are connected through the crossbar 71, the frame is transmitted to the port 61-1. Without being delayed in the sending buffer 640 in the port 61-1, the frame is transmitted from the port 61-2 to the computer 10 and reaches the computer 10 through the cable 51.

Thus, the latency of the transmission of the frame from the storage 45 to the computer 10 is equal to the sum of the latency 3×L for three switches 31-1 to 31-3 and the delay time 0 in the sending buffer 640 in the switches 31-1 to 31-3, that is 3L.

The transmission of a frame from the storage 46 to the computer 10 is only different in that the port receiving the frame in the switch 31-3 is the port 64-3 instead of the port 63-3. Thus, the latency of the transmission of a frame from the storage 46 to the computer 10 is equal to 3L which is equal to that for the transmission of a frame from the storage 45 to the computer 10.

In this way, in the storage system 1 according to an example of this embodiment, the switches 31-1 to 31-3 hold the corresponding latency tables so that latencies in the transmission and reception of frames between the computer 10 and the storages 41 to 46 can be equal. In other words, the storages 41 to 46 may typically have a latency of 3L independent of the positions of the switches 31-1 to 31-3. This allows an equal processing time for the reading processing (Read) from the storages 41 to 46 or writing processing (Write) to the storages 41 to 46 to be performed in transmission and reception of many frames. The equal processing time for the reading processing (Read) from the storages 41 to 46 or the writing processing (Write) to the storages 41 to 46, for example, can prevent performance imbalance.

The latency tables held by the corresponding switches 31-1 to 31-3 allow an equal latency between the computer 10 and the storages 41 to 46. Thus, an equal latency can be allowed between a computer and storages easily without complicated processing even when the number of cascade-connected switches increases.

In the storage system 1 according to an example of this embodiment, the latency for frames may be variably controlled. Thus, also in cloud computing in which the resource to be used in a system differs every time, responses can be returned to users in an equal processing time.

[B] Others

The disclosed technology is not limited to the embodiment but may be changed variously without departing from the spirit and scope of this embodiment.

For example, according to an example of this embodiment, the CPU 11 in the computer 10 implements the topology identification function. However, routing table creating function, latency calculation function and latency table creating function, but the disclosed technology is not limited thereto. For example, the CPU 91 included in each of the switches 31 may implement the topology identification function, routing table creating function, latency calculation function and latency table creating function. In this case, the latency calculation functions of the switches 31 logically determine the latencies between the computer 10 and the storages 41 to 46 from the transmission rates of the cables 51 to 53 between the computer 10 and the storages 41 to 46 and the processing times required for routing in the switches 31. The routing table creating functions of the switches 31 create latency tables to be used by the switches 31 on the basis of the latencies determined by the latency calculation functions. Since the switches 31 know their places among the switches with the topology identification function, the switches 31 may create latency tables illustrated in FIGS. 7A to 7C, for example.

Having described according to an example of this embodiment the case using three cascade-connected switches 31, the present technology is not limited thereto. Two or fewer or four or more switches 31 may be cascade-connected.

Having described according to an example of this embodiment that two storages are provided under each of the switches 31, the present technology is not limited thereto. One or three or more storages may be provided under each of the switches 31.

Having described according to an example of this embodiment that an equal number of storages are provided under each of the switches 31, the present technology is not limited thereto. Different numbers of storages may be provided under the switches 31.

Having described according to an example of this embodiment that the storages 41 to 46 have an equal response time to frames, the present technology is not limited thereto. For example, when different types of storages (such as SSD (Solid State Drive), SAS disk, SATA (Serial ATA) disk) are provided within a storage apparatus, the latency values on the latency tables may be changed on the basis of the response differences between different types of storage. More specifically, storages with a short response time to a frame may be delayed by the response difference between the storage with a short response time and a storage with a long response time. This allows an equal latency between a computer and different types of storages.

Having described according to an example of this embodiment that the latency values on the latency tables are set by the computer 10, the present technology is not limited thereto. The latency values may be set by an external apparatus such as a user apparatus. For example, the latency value for a certain entry may be set to 0 because of the system requirement of a user apparatus.

Having described according to an example of this embodiment that each of the latency tables has correspondence between destinations of frames, distribution destination ports and latency values, as illustrated in FIGS. 7A to 7C, the present technology is not limited thereto. For example, each of the latency tables may additionally hold a field for setting a latency for each type of frame. For example, the arbitration processing to be performed for acquiring a bus uses an algorithm allowing arbitration to be performed as fair as possible between devices. However, since the algorithm is designed assuming a general configuration, the arbitration may be unfair in some specific configurations. Holding the field for setting a latency for each type of frame in a latency table allows setting a special latency value for a frame (such as an OPEN frame in SAS) to be used for arbitration and can prevent unfair arbitration in specific configurations.

Having described according to an example of this embodiment that each of the latency tables has correspondence between destinations of frames, distribution destination ports and latency values, as illustrated in FIGS. 7A to 7C, the present technology is not limited thereto. In SAS, for example, subtractive routing processing is performed which handles one specific port (subtractive port) as a distribution destination port if the destination address does not exist in the routing table. Accordingly, in order to set a latency value even when the destination address does not exist within the latency table, the latency table may have a field for setting a latency value when the subtractive port is determined as the distribution destination port. The latency value to be set is a value for the final connection destination (computer in many cases) of the subtractive port, for example.

Having described according to an example of this embodiment that the value 0 is set for routing to the delay time setting unit 636 in the distribution destination port when the latency value is equal to 0, the present technology is not limited thereto. No latency value may be set to the delay time setting unit 636 in the distribution destination port.

When no latency value is set within a latency table, the value 0 may be set for routing to the delay time setting unit 636 in the distribution destination port, or a route not through the sending buffer 640 in the distribution destination port may be prepared.

Having described according to an example of this embodiment that the switches 31-1 to 31-3 hold the corresponding latency tables, the present technology is not limited thereto. For example, even when the switches 31-1 to 31-3 hold the corresponding routing tables, the frame processing units 620 in the ports 61 to 64 of the switches 31-1 to 31-3 may determine the transmission paths, calculate the latency values and set the latency value to the delay time setting unit 636 in the distribution destination port, on the basis of the destination of the received frame.

Having described according to an example of this embodiment that the latencies between the computer 10 and the storages 41 to 46 are equal when they are a maximum latency (3L), they may be equal when they are higher than the maximum latency.

According to an example of this embodiment, the CPU 11 executes various application programs recorded in the memory 13 to implement the topology identification function, routing table creating function, latency calculation function and latency table creating function. However, the present technology is not limited thereto, but the storage interface (IF) 14 may implement those functions instead of the CPU 11.

Having described according to an example of this embodiment that each of the switches 31 is an LSI (Large-Scale integration), the functions of the components (such as the frame processing unit 620, setting unit 630, and delay time setting unit 636) within each of the switches 31 may be implemented by FPGAs (Field Programmable Gate Arrays), for example.

There have been described according to an example of this embodiment that the cables 51 to 53 have an equal length, and the times for propagating frames through the cables 51 to 53 are equal. However, the present technology is not limited thereto. Having described according to an example of this embodiment that the routing times in the switches 31-1, 31-2, and 31-3 are equal, the present technology is not limited thereto. In other words, when the times for propagating frames through the cables 51 to 53 are different, a latency table may be created in consideration of the differences in frame propagation time. When the routing times in the switches 31-1, 31-2, and 31-3 are different, a latency table may be created in consideration of the differences in routing time.

The various application programs for implementing the functions of the CPU 11 and chip set 12 and various application programs for implementing the functions of the CPU 91 are recorded and provided in a computer-readable recording medium such as a flexible disk, a CD (such as a CD-ROM, a CD-R, and a CD-RW), a DVD (such as a DVD-ROM, a DVD-RAM, a DVD-R, a DVD+R, a DVD-RW, a DVD+RW, and HD DVD), a Blu-ray disk, a magnetic disk, an optical disk, an magneto-optical disk. A computer reads the programs from the recording medium and transfers and stores it to an internal storage or external storage for use. The programs may be recorded in a storage (recording medium) such as a magnetic disk, an optical disk, and a magneto-optical disk and may be provided from the storage through a communication path to a computer.

It is an object of the present case to provide accessibility with an equal latency to a computer or storages independent of the transmission distance between the computers and the storages and to reduce adverse effects of different latencies on the entire system. Conceptually, the expression "the same" includes not only being completely the same but also being substantially the same.

According to the disclosed storage apparatus, switch and storage apparatus control method, an equal latency is provided between a computer and storages independent of the transmission distances between the computer and the storages, and the adverse effect caused by differences in latency on the entire system can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage apparatus to be connected to a computer, comprising:
 a plurality of switches including a memory and connected to the computer by a cascade connection, respectively; and
 a plurality of storages connected to the plurality of switches,
 wherein
 each memory is configured to store a latency value corresponding to the plurality of storages and the computer, the latency value being determined so as to equal each time from transmitting of a frame by the computer to receiving of a response from the plurality of storages for the frame by the computer, and the plurality of switches is configured to transmit a frame including a destination address indicating one of the plurality of storages and the computer to the destination address after a time corresponding to the latency value corresponding to the destination address elapsed, wherein a latency table is created for each of the plurality of switches corresponding to the destination address, wherein one of the plurality of switches is configured to transmit the frame after the time corresponding to the latency value elapsed when the destination address of the frame indicates one of the plurality of storages connected to the one of the plurality of switches, wherein the plurality of switches includes at least first and second switches, the first switch being connected to the computer, the second switch being connected to the first switch, and wherein when the first switch receives from the computer a frame having a destination address indicating one of the plurality of storages connected to one of the first and second switches, the first switch transmits the frame to the one of the plurality of storages connected to one of the first and second switches after a delay time corresponding to the latency value elapsed, the delay time of the first switch decreases as a frame transmission time from the computer to the one of the plurality of storages connected to one of the first and second switches increases.

2. The storage apparatus according to claim 1, wherein the first switch having a latency table storing a plurality of delay times, wherein when the first switch receives from the computer a frame having a destination address indicating one of the plurality of storages connected to the first switch, the first switch transmits the frame to the one of the plurality of storages connected to the first switch after a delay time being a maximum value among the plurality of delay times of the first switch elapsed, wherein when the first switch receives from the computer a frame having a destination address indicating one of the plurality of storages connected to the second switch, the first switch transmits the frame to the one of the plurality of storages connected to the second switch after a delay time being a minimum value among the plurality of delay times of the first switch elapsed, and wherein when the second switch receives through the first switch from the computer a frame having a destination address indicating one of the plurality of storages connected to the second switch, the second switch transmits the frame to one of the plurality of storages connected to the second switch without a delay time.

\* \* \* \* \*